Patented Mar. 28, 1933

1,902,904

UNITED STATES PATENT OFFICE

KARL SCHÖLLKOPF, OF DUSSELDORF-OBERKASSEL, AND ARTHUR SERINI, OF DUSSELDORF-HEERDT, GERMANY, ASSIGNORS TO RHEINISCHE KAMPFER-FABRIK GESELLSCHAFT MIT BESCHRANKTER HAFTUNG, OF DUSSELDORF-OBERKASSEL, GERMANY, A GERMAN COMPANY

PROCESS FOR PREPARING THYMOL

No Drawing. Application filed January 5, 1931, Serial No. 506,747, and in Germany October 12, 1927.

The present invention relates to a process for preparing thymol by reaction of $m$-cresol with propylene-yielding substances.

We have discovered the fact that propylene-yielding substances may be caused to react with $m$-cresol to form propyl or isopropyl derivatives of $m$-cresol by simply heating them together, eventually under pressure. The reaction conditions can be so chosen that the main product of the said reaction is thymol (3-hydroxy-1-methyl-4-isopropyl-benzene).

Propylene-yielding substances are such propane derivatives in which one hydrogen atom or propane is substituted by a negative group, for instance Cl—, HO—, and $C_3H_7$.O—. As propylene-yielding substances we employ e. g. propyl alcohol, dipropyl ether, propyl halides or the corresponding isopropyl compounds.

The condensation is effected by heating the propylene-yielding substance, for example isopropyl alcohol, with $m$-cresol to about 300° C. to 400° C. under pressure, whereby propyl or isopropyl derivatives of the $m$-cresol, containing a preponderating amount of thymol, are obtained. In general $m$-cresol and the propylene-yielding substances are employed in such proportions that 1 mol of propylene-yielding substance is available for 1 mol of $m$-cresol. An excess of $m$-cresol represses, and an excess of propylene-yielding substance promotes, the formation of multiple propylated addition products. The propylene-yielding substance can be employed at once in the requisite quantity or it may be introduced into the reaction in several portions. In the latter case the removal of the water or the hydrogen halide acid formed may be effected by distillation before each addition of fresh quanities of the propylene-yielding substance, whereby a lowering of the pressure is effected. The hydrogen halide acids formed when propyl or isopropyl halides are used, can be kept in the reaction mixture by the addition of metal oxides such as zinc oxide or magnesium oxide.

We have further found that the condensation of propylene-yielding substances with $m$-cresol, as described above, may be effected in a technically more simple manner with the aid of catalysts, as the temperature, the pressure and the reaction period are decreased thereby. A large number of substances of the most varied kinds can be employed as catalysts for the reaction in question. The usual condensing and dehydrating catalysts are particularly suitable, for example, sulphuric acid, hydro-chloric acid, sulphonic acids, phosphoric anhydride, metal oxides, for example, aluminum oxide, thorium oxide, tungstic oxide and the like; metal salts, for example, zinc chloride, aluminum chloride, ferric chloride, magnesium chloride, potassium bisulphate, potash alum, aluminium sulphate, aluminium phosphate, aluminium silicate, other metallic silicates and the like; contact substances, for example, active charcoal, silica gels, kieselguhr, kaoilin, clay, fuller's earths, bleaching earths, siliceous earths and the hydrosilicates obtained from the above-mentioned silicates by the action of acids and the like. The use of phosphoric acid as catalyst is excluded from our invention.

The catalysts may be employed in several different ways, either alone or mixed with one another or deposited on carriers, which may consist of any of the above-mentioned contact substances or of other substances, for example, pumice stone, barium sulphate and the like.

The action of the catalysts on the condensation varies. The temperature, pressure and period of reaction have, therefore, to be varied according to the catalytic action. The examples illustrate the preferred method of procedure for individual cases.

The reaction product obtained in the described condensation of propylene-yielding substances with $m$-cresol with and without the aid of catalysts is subjected to fractional distillation in order to separate the thymol from the by-products.

The first fractions coming over consist of unchanged $m$-cresol and, according to the reaction conditions, an isomer of thymol (3-hydroxy-1-methyl-2-isopropyl-benzene) having a melting point of 69° C. and a boiling point of 228° C. to 229° C. From the middle and main fraction of the fractional distillation thymol, having a boiling point of 232°

C. and a melting point of 51° C., is obtained. The next fractions yield an isomer of thymol (3-hydroxy-1-methyl-6-isopropyl-benzene) of melting point 114° C. and boiling point 245° C. to 246° C. and also di-propyl or di-isopropyl-*m*-cresols having a boiling point of about 265° C. According to the reaction conditions derivatives of *m*-cresol propylated at the oxygen atom, for example, isopropyl-*m*-cresyl ether of boiling point 196° C. to 197° C., and the higher boiling isopropyl-thymyl ether and higher propylated *m*-cresol ethers are obtained. If these ethers should be present, they are separated in known manner from the phenol mixture by treating the reaction product with dilute caustic-alkalies and the phenol mixture subjected to fractional distillation.

By correctly regulating the reaction thymol is obtained as the main product and the by-products mentioned only in subordinate quantities, as is shown in the following examples:—

(1) 108 parts by weight of *m*-cresol are heated to about 350° C. with 28 parts by weight of isopropyl alcohol or 23 parts by weight of di-isopropyl ether in an autoclave with stirring for 6 to 10 hours. The resulting water of reaction is distilled off and the condensation continued under the same conditions as above by again adding 28 parts by weight of isopropyl alcohol or 23 parts by weight of di-isopropyl ether to the reaction product. Thymol having a boiling point of 232° C. is separated from the final reaction product by fractional distillation and obtained pure with a melting point of 51° C. by crystallization from benzine. Taking into consideration the *m*-cresol recovered during the distillation, thymol is obtained in a yield of about 60% to 70% of the *m*-cresol reacted upon.

(2) 108 parts by weight of *m*-cresol are heated with stirring to about 230° C. with 32 parts by weight of propyl chloride and 20 parts by weight of zinc oxide in an autoclave for 10 to 20 hours. The resulting water of reaction is then distilled off and the condensation continued under the above conditions by adding the same quantities of propyl chloride and zinc oxide. The final product obtained is subjected to steam distillation, followed by fractional distillation, whereby the thymol is obtained as in Example 1. At the same time a by-product consisting of an isomer of thymol (3-hydroxy-1-methyl-6-isopropyl-benzene) having a melting point of 114° C. and a boiling point of from 245° C. to 246° C. is obtained.

(3) 108 parts by weight of *m*-cresol are heated for about 15 to 25 hours to about 200° C. to 250° C. with 56 parts by weight of propyl alcohol or 46 parts by weight of di-propyl ether or the corresponding isopropyl compounds in an autoclave with stirring in the presence of about 20 to 30 parts by weight of a catalyst, for example, anhydrous zinc chloride or an activated bleaching earth.

Propyl or isopropyl halides may also be employed as in Example 2, zinc oxide or magnesium oxide or a similar metal oxide being preferably added in order to fix the hydrogen halide acids formed. The propylene-yielding substances can also be added in several portions as described in Examples 1 and 2. After separating the catalyst any alkali-insoluble ethers (isophopyl-*m*-cresyl ether and isopropyl-thymyl ether and higher propylated *m*-cresyl ethers) present are separated from the condensation product by treating the latter with dilute caustic soda. On acidifying the alkaline solution an ether-free phenol mixture is obtained. The latter or the ether-free condensation product is fractionally distilled. About 60% of the *m*-cresol employed is recovered in the first fraction. A small fraction can be collected from which the isomer of thymol having a melting point of 69° C. and a boiling point of from 228° C. to 229° C. separates out. The next and larger fraction contains the thymol having a boiling point of 232° C., which separates out on cooling and which can be obtained pure with a melting point of 51° C. by crystallization from benzine. The isomer of thymol having a melting point of 114° C. and a boiling point of 245° C. to 246° C. crystallizes out from the final fraction. The residue—an oil boiling at about 265° C.—consists of a mixture of various di-propyl or di-isopropyl *m*-cresols. The yield in thymol amounts to about 50% to 60% of the *m*-cresol reacted upon.

(4) 108 parts by weight of *m*-cresol are passed, together with 45 to 55 parts by weight of isopropyl alcohol or 40 to 45 parts of di-isopropyl ether or 60 to 70 parts by weight of isopropyl chloride or the corresponding propyl compounds, over a catalyst at normal or reduced pressure and about 150° C. to 350° C. The contact substance or catalyst may, for example, be aluminium oxide, which is shaped or pressed into pieces whilst in a moist condition and then dried. As catalyst there may also be employed thorium oxide mounted on pumice, aluminium phosphate or aluminium hydroxide deposited on kieselguhr, active charcoal containing zinc chloride, brick clay, fuller's earths or one of the activated bleaching earths used in commerce, preferably in the form of pieces about of the size of a bean. The speed at which the reacting substances are passed through one of the usual contact apparatus is so regulated that as high a yield of thymol as possible is obtained. The rate of passage also depends on the nature of the catalyst employed, the length and volume of the contact space and the reaction temperature. The amount of the propylene-yielding substance passed through the apparatus is such that an excess of propylene leaves the apparatus together with the condensation product. The condensation product is treated and the thymol obtained as in Example 3.

What we claim is:

1. A process for preparing thymol (3-hydroxy-1-methyl-4-isopropyl-benzene) which consists in causing propane derivatives in which one hydrogen atom of propane is substituted by a negative group to react with m-cresol at temperatures from 100° C. to 400° C. and subjecting the reaction product obtained to fractional distillation.

2. A process for preparing thymol which consists in causing propyl-mono-halide to react with m-cresol at temperatures from 100° C. to 400° C. and subjecting the reaction product obtained to fractional distillation.

3. A process for preparing thymol which consists in causing isopropyl alcohol to react with m-cresol at temperatures from 100° C. to 400° C. and subjecting the reaction product obtained to fractional distillation.

4. A process for preparing thymol which consists in causing di-isopropyl ether to react with m-cresol at temperatures from 100° C. to 400° C. and subjecting the reaction product obtained to fractional distillation.

5. A process for preparing thymol which consists in causing propane derivatives in which one hydrogen atom of propane is substituted by a negative group to react with m-cresol at temperatures from 100° C. to 400° C. and increased pressure and subjecting the reaction product obtained to fractional distillation.

6. A process for preparing thymol which consists in causing propane derivatives in which one hydrogen atom of propane is substituted by a negative group to react with m-cresol at temperatures from 100° C. to 400° C. in the presence of condensing and dehydrating catalysts containing no free phosphoric acid and subjecting the reaction product obtained to fractional distillation.

7. A process for preparing thymol which consists in causing propane derivatives in which one hydrogen atom of propane is substituted by a negative group to react with m-cresol at temperatures from 100° C. to 400° C. and increased pressure in the presence of condensing and dehydrating catalysts containing no free phosphoric acid and subjecting the reaction product obtained to fractional distillation.

8. A process for preparing thymol which consists in causing propane derivatives in which one hydrogen atom of propane is substituted by a negative group to react with m-cresol at temperatures from 100° C. to 400° C., treating the condensation product with dilute caustic alkalis, separating the alkali-insoluble ethers from the alkaline solution, acidifying the alkaline solution and subjecting the phenol mixture thus obtained to fractional distillation.

9. A process for preparing thymol which consists in causing propylene-yielding substances to react with m-cresol at temperatures from 100° C. to 400° C. and subjecting the reaction product so obtained to fractional distillation.

10. A process for preparing thymol which consists in causing propylene-yielding substances to react with m-cresol at temperatures from 100° C. to 400° C. in the presence of condensing and dehydrating catalysts containing no free phosphoric acid and subjecting the reaction product obtained to fractional distillation.

11. A process for preparing thymol which consists in causing propylene-yielding substances to react with m-cresol at temperatures from 100° C. to 400° C., treating the condensation product with dilute caustic alkalis, separating the alkali-insoluble ethers from the alkaline solution, acidifying the alkaline solution and subjecting the phenol mixture thus obtained to fractional distillation.

In testimony whereof, we hereunto set our hands this 17th day of December, 1930.

KARL SCHÖLLKOPF.
ARTHUR SERINI.